Patented Apr. 10, 1951

2,548,728

UNITED STATES PATENT OFFICE 2,548,728

PREPARATION OF NICKEL CARBONYL

John F. Kincaid, Mount Holly, N. J., and James S. Strong, Philadelphia, Pa., assignors to Rohm & Haas Company, Philadelphia, Pa., a corporation of Delaware No Drawing. Application May 4, 1949, Serial No. 91,418

6 Claims. (Cl. 23—203)

This invention relates to a process of preparing nickel carbonyl. More particularly it relates to a "wet" process whereby compounds of nickel in aqueous media are rapidly converted to nickel carbonyl by the action of gases containing carbon monoxide under super-atmospheric pressure and at elevated temperatures in the presence of a catalyst or promoter which provides cyanide ions.

Heretofore, nickel carbonyl has been made by reacting carbon monoxide and an activated nickel compound, often activated nickel metal itself, in the dry form. This reaction is the basis of the well-known Mond process for the recovery of nickel from ores and other mixtures. It has been found that sulfur compounds, such as hydrogen sulfide gas or solid sodium sulfide, are effective assistants in the reaction of the solid nickel compound and the carbon monoxide. It has also been shown that aqueous solutions of nickel salts, to which alkali metal hydroxides and alkali metal sulfides have been added in high ratios, will react with carbon monoxide slowly at room temperatures.

Processes which utilize nickel carbonyl in the production of organic compounds leave residues from which the nickel can be readily recovered in the form of water-soluble nickel salts. It is highly desirable, therefore, that there be available an efficient and industrially practical method of converting such nickel salts back to nickel carbonyl. The object of this invention is to provide such a method, since the processes of the prior art are impractical or too costly from a commercial standpoint. By the process of this invention, almost quantitative yields of nickel carbonyl are rapidly obtained from water-soluble nickel salts in a single operation.

The invention is based on the discovery that carbon monoxide under pressure reacts very rapidly with an aqueous slurry of freshly precipitated hydrated nickel oxide which contains cyanide ions. Better than 99% conversion of the nickel compound to nickel carbonyl is obtainable in reaction times as low as one hour.

In carrying out this process, a slurry of freshly precipitated hydrated nickel oxide containing an appropriate amount of cyanide ion is first prepared. The slurry can be made conveniently by mixing an aqueous solution of a water-soluble nickel salt and an aqueous solution of an alkali metal hydroxide or an aqueous suspension of an alkaline earth metal hydroxide. The compound which furnishes the cyanide ion can be added to the solution of the nickel salt, or to the hydroxide solution, or to the final slurry. Nickel chloride and sulfate are the preferred salts and sodium hydroxide is the preferred base. Other water-soluble nickel salts may be used, and other alkali, or alkaline earth metal hydroxides, such as potassium or calcium hydroxide, may be substituted for the sodium hydroxide. This process is particularly beneficial in converting to nickel carbonyl impure water-soluble nickel salts, such as those which are obtained as a result of the reaction of nickel carbonyl with organic compounds, such as, for example, in the reaction of nickel carbonyl with acetylene, alcohol and hydrocholoric acid. The concentration of the hydrated nickel oxide in the aqueous slurry may vary over a wide range, but the slurry should be sufficiently fluid to permit easy agitation. From one-tenth to one and one-half moles of hydrated nickel oxide per liter of slurry gives good results and about two-thirds mole per liter is preferred. If desired, a dispersing agent may be added to increase the fluidity of the slurry.

The most convenient source of the cyanide ion is a water-soluble metallic cyanide. The alkali metal cyanides are of course preferred, but other cyanides or compounds which are soluble and which supply sufficient cyanide ions in the alkaline aqueous slurry are satisfactory, such as the cyanides of calcium, barium, strontium and the like. Since the role of the cyanide ion which is present is that of a promoter or catalyst, the amount of the cyanide ion is important. Initial amounts as low as 2.5 mole per cent of the cyanide ion based on the hydrated nickel oxide are effective, but larger amounts are recommended. From 5 to 25 mole per cent so accelerate the reaction as to make it commercially practical and attractive as evidenced by the fact that whereas carbon monoxide and a slurry of hydrated nickel alone fail to react, the same mixture under the same conditions but with the above amounts of cyanide ion added will react rapidly and substantially completely. A mole of cyanide ion is the molecular weight of the ion, 26, expressed in units of weight and the mole per cent is the number of moles of cyanide ion multipled by 100 and divided by the moles of nickel oxide.

During the reaction, the slurry of hydrated nickel oxide should at all times be kept alkaline. This is accomplished by adding to the solution of nickel salt, when making the hydrated nickel oxide, more than the stoichiometric equivalent amount of alkali or alkaline earth metal hydroxide. If acidic materials are present, they must also be neutralized. It is necessary to add an excess of basic material to compensate for any acid substances that may be generated during the reaction and to assure that the reaction mixture is always alkaline. Usually the pH of the slurry at the start of the reaction should be above 10.0. During the reaction it should not drop below 7.5.

Another factor of considerable importance is that the reaction with carbon monoxide should be carried out on freshly prepared hydrated nickel oxide. If the slurry of precipitated oxide is allowed to stand, molecular changes apparently take place which result in both a slower rate of reaction and lower yields of nickel carbonyl.

The reaction can be carried out over a wide range of temperature and pressure. The reaction takes place at temperatures as low as 40° C., but at such slow rates as to be commercially impractical. It is, therefore, most desirable to operate at higher temperatures. Temperatures as high as 350° C. have been used but here again practical considerations, such as cost and ease of operation, point to the advisability of employing lower temperatures. Accordingly, a lower limit of 50° C. and an upper limit of 200° C. is suggested; and the range from 60° C. to 160° C. is particularly recommended. Pressures above about 1000 lbs. per square inch give practical rates of reaction, but it is better to operate at 1400 to 3000 lbs. per square inch. The upper range of pressure is limited only by the limitations of equipment.

The following examples illustrate the practice of this invention and demonstrate the promoting or catalytic effect of cyanide ions on the reaction of carbon monoxide and hydrated nickel oxide. Whereas the yields of carbonyl are high and are obtained rapidly in the presence of the cyanide ion, the same slurry of hydrated nickel oxide and carbon monoxide fail to react, under the conditions which are set forth in the following example, in the absence of the cyanide ion catalyst.

*Example*

A series of batches of nickel carbonyl was prepared as follows: A hydrated nickel oxide slurry was prepared in a 500 cc. rocker bomb by adding an aqueous solution containing 0.15 mole of sodium hydroxide and potassium cyanide to an aqueous solution of nickel chloride. The amount of nickel chloride and potassium cyanide was varied in some cases from batch to batch as recorded in the tabulation below. The volume of the slurry was in all cases adjusted to 150 cc. by the addition of water. The bomb was sealed, placed in the rocking device and heated to the temperature recorded in the tabulation below. Carbon monoxide was introduced into the bomb until the pressure therein measured 2000 lbs. per square inch. Rocking was begun and was continued together with heating until there was no further drop in pressure. At this point the rocking was discontinued, the bomb was vented, and the nickel carbonyl was separated and its amount determined. The results of several runs are herewith recorded:

| Moles of Hydrated Nickel Oxide | Mole percent of cyanide ion | Temp. ° C. | Initial Pressure, lbs./sq. in. | Time of Reaction Min. | Yield of Ni(CO)$_4$ Per cent |
|---|---|---|---|---|---|
| 0.075 | 13.1 | 60 | 2,000 | 75 | 99.8 |
| 0.099 | 13.9 | 60 | 2,000 | 70 | 97.5 |
| 0.075 | 13.3 | 73 | 2,000 | 75 | 97.8 |
| 0.068 | 14.3 | 79 | 2,000 | 45 | 97.8 |
| 0.075 | 13.3 | 100 | 2,000 | 45 | 98.3 |
| 0.075 | 13.3 | 110 | 2,000 | 45 | 96.8 |
| 0.099 | 13.9 | 150 | 2,000 | 35 | 99.3 |

The above example illustrates the invention as it may be carried out in batch operations. Other apparatus capable of insuring good dispersion of the carbon monoxide in the slurry of hydrated nickel oxide may also be used and, with suitable equipment such as is used in reactions between gases and liquid materials, the process may be carried out in a continuous or semi-continuous manner. To insure the freshness of the hydrated nickel oxide slurry, it is desirable that the solution of nickel salt and alkali metal hydroxide be mixed in the reactor. This may be conveniently done in a continuous process by means of a vertical column wherein the two solutions, one of which contains the catalyst, are added to the column and carbon monoxide is continuously circulated upwardly through the column, then through a condenser to separate the nickel carbonyl, and then back to the bottom of the column. The rate of flow of the carbon monoxide may be adjusted to give good dispersion in the slurry, and this may be aided by suitable baffles placed in the column. Spent liquid is withdrawn at the top of the column.

Although this preparation of nickel carbonyl depends on the reaction of carbon monoxide, other gases which are inert under the conditions employed herein may also be present. For example, a mixture of carbon monoxide and hydrogen such as occurs in water gas can be used. In such instances it has been found desirable to use a higher pressure than is required when undiluted carbon monoxide is employed.

We claim:

1. The process of preparing nickel carbonyl which comprises bringing carbon monoxide into intimate contact, at a temperature of 50° C. to 200° C. and under a pressure in excess of 1000 lbs. per square inch, with an alkaline, aqueous slurry of a freshly precipitated hydrated nickel oxide, prepared by mixing in water a water-soluble nickel salt and a member of the class consisting of alkali and alkaline earth metal hydroxides, said slurry being maintained at an alkaline pH of at least 7.5 and containing cyanide ions in an amount equal to 2.5 to 25 mole per cent based on the weight of said hydrated nickel oxide, and thereafter isolating the resultant nickel carbonyl.

2. The process of preparing nickel carbonyl which comprises bringing carbon monoxide into intimate contact, at a temperature of 50° C. to 200° C. and under a pressure of 1400 to 3000 lbs. per square inch, with an alkaline, aqueous slurry of a freshly precipitated hydrated nickel oxide, prepared by mixing in water a water-soluble nickel salt and a member of the class consisting of alkali and alkaline earth metal hydroxides, said slurry being maintained at an alkaline pH of at least 7.5 and containing cyanide ions in an amount equal to 5.0 to 25 mole per cent based on the weight of said hydrated nickel oxide, and thereafter isolating the resultant nickel carbonyl.

3. The process of preparing nickel carbonyl which comprises bringing carbon monoxide into intimate contact, at a temperature of 60° C. to 160° C. and under a pressure of 1400 to 3000 lbs. per square inch, with an alkaline, aqueous slurry of a freshly precipitated hydrated nickel oxide, prepared by mixing in water a water-soluble nickel salt and a member of the class consisting of alkali and alkaline earth metal hydroxides, said slurry being maintained at an alkaline pH of at least 7.5 and containing cyanide ions in an amount equal to 5.0 to 25 mole per cent based on the weight of said hydrated nickel oxide, and thereafter isolating the resultant nickel carbonyl.

4. The process of preparing nickel carbonyl which comprises bringing carbon monoxide into intimate contact, at a temperature of 60° C. to 160° C. and under a pressure of 1400 to 3000 lbs. per square inch, with an alkaline, aqueous slurry of a freshly precipitated hydrated nickel oxide, prepared by mixing in water a water-soluble nickel salt and a member of the class consisting of alkali and alkaline earth metal hydroxides, said slurry being maintained at an alkaline pH of at least 7.5 and containing an alkali metal cyanide in an amount equal to 5.0 to 25 mole per cent based on the weight of said hydrated nickel oxide, and thereafter isolating the resultant nickel carbonyl.

5. The process of making nickel carbonyl which comprises passing an aqueous slurry of hydrated nickel oxide, which is maintained at an alkaline pH of at least 7.5 and which contains cyanide ions in an amount equal to 2.5 to 25 mole per cent based on said nickel oxide and which is freshly prepared by mixing an aqueous solution of a water-soluble nickel salt and a solution of a member of the class consisting of alkali and alkaline earth metal hydroxides, through a vertical column which is heated to a temperature of 50° C. to 200° C., passing carbon monoxide under a pressure in excess of 1000 lbs. per square inch upwardly through said column in intimate contact with said slurry and withdrawing both liquid and gaseous products from said column and separating nickel carbonyl from said products.

6. The process of making nickel carbonyl which comprises passing an aqueous slurry of hydrated nickel oxide, which is maintained at an alkaline pH at least 7.5 and which contains an alkali metal cyanide in an amount equal to 5.0 to 25 mole per cent based on said nickel oxide and which is freshly prepared by mixing an aqueous solution of a water-soluble nickel salt and a solution of a member of the class consisting of alkali and alkaline earth metal hydroxides, through a vertical column which is heated to a temperature of 60° C. to 160° C., passing carbon monoxide under a pressure of 1400 to 3000 lbs. per square inch upwardly through said column in intimate contact with said slurry and withdrawing both liquid and gaseous products from said column and separating nickel carbonyl from said products.

JOHN F. KINCAID.
JAMES S. STRONG.

REFERENCES CITED

The following references are of record in the file of this patent:

FOREIGN PATENTS

| Number | Country | Date |
|---|---|---|
| 327,956 | Great Britain | Apr. 14, 1930 |

OTHER REFERENCES

Mellor: "Comprehensive Treatise on Inorganic and Theoretical Chemistry"; (1936), vol. 15, page 383.